(12) United States Patent
Kobayashi et al.

(10) Patent No.: US 7,595,837 B2
(45) Date of Patent: Sep. 29, 2009

(54) IMAGE PICKUP APPARATUS AND GRASP MEMBER THEREOF

(75) Inventors: Hisao Kobayashi, Osaka (JP); Masakazu Okuda, Osaka (JP); Nobutaka Kanayama, Osaka (JP); Yoshiaki Akutagawa, Osaka (JP); Hidenori Tomita, Hyogo (JP)

(73) Assignee: Panasonic Corporation, Osaka (JP)

( * ) Notice: Subject to any disclaimer, the term of this patent is extended or adjusted under 35 U.S.C. 154(b) by 553 days.

(21) Appl. No.: 11/402,003

(22) Filed: Apr. 12, 2006

(65) Prior Publication Data

US 2006/0232746 A1 Oct. 19, 2006

(30) Foreign Application Priority Data

Apr. 13, 2005 (JP) .............................. 2005-115321

(51) Int. Cl.
*G03B 17/02* (2006.01)
(52) U.S. Cl. ........................ 348/374; 348/373; 348/375; 348/376; 396/419; 396/424; D16/200; D16/205; D16/210; D16/215; D16/220; D16/241; D16/246

(58) Field of Classification Search ......... 348/373–376; 396/419, 428; D16/200–220, 237–250
See application file for complete search history.

(56) References Cited

U.S. PATENT DOCUMENTS

2004/0126099 A1 * 7/2004 Mori et al. .................. 386/117

FOREIGN PATENT DOCUMENTS

| JP | 03-75424 | 7/1991 |
| JP | 2000-078458 | 3/2000 |
| JP | 2001-189883 | 7/2001 |
| JP | 2003-259171 | 9/2003 |

\* cited by examiner

*Primary Examiner*—Jason Chan
*Assistant Examiner*—Yih-Sien Kao
(74) *Attorney, Agent, or Firm*—Steptoe & Johnson LLP

(57) ABSTRACT

There is provided a grasp member joined to the top portion of an image pickup apparatus body including a lens barrel unit at the front end and a display unit at the rear end through leg portions. Here, the front one of the leg portions is joined to the image pickup apparatus body at an offset position to the left from an optical axis of light incident on the lens barrel unit.

6 Claims, 4 Drawing Sheets

IMAGE PICKUP APPARATUS AND GRASP MEMBER THEREOF

BACKGROUND

1. Technical Field

The present invention relates to an image pickup apparatus such as a portable video camera recorder and a grasp member thereof.

2. Description of the Related Art

There are image pickup apparatuses having a grasp member fitted thereto for convenience of portability when carrying such image pickup apparatuses. Conventionally, a grasp member is joined at its front and rear leg portions to an image pickup apparatus body. Specifically, the front leg portion is joined to the image pickup apparatus body in a substantially vertically arranged state (for example, see JP-A-2003-259171).

FIGS. 3 and 4 are perspective views illustrating a conventional image pickup apparatus. A body portion 12d of a grasp member is disposed on the top of an image pickup apparatus body 1 in parallel to the image pickup apparatus body 1 with a gap therebetween. The front portion of the body portion 12d of the grasp member is joined to the image pickup apparatus body 1 through a front leg portion 12a and the rear portion of the body portion 12d is joined to the image pickup apparatus body 1 through a rear leg portion 2b. The front leg portion 12a has a quadrangular prism shape and extends in the vertical direction between the image pickup apparatus body 1 and the body portion 12d of the grasp member.

Such a grasp member 12 of the image pickup apparatus requires excellent operability of operation rings 4 and 5 for adjusting a focus and an aperture diaphragm of a lens barrel portion 3 as an operation target at the time of picking up an image with the image pickup apparatus, and a wide front visual range at the time of holding the image pickup apparatus body 1 for picking up an image.

However, such a conventional grasp member has a problem that the operability is deteriorated because a hand of a user comes in contact with the front leg portion 12a at the time of adjusting the operation rings 4 and 5. In addition, as shown in FIG. 4, when the user holds the image pickup apparatus body 1 with his hand and his left eye approaches a view finder 7, the visual range of the left eye directly viewing a subject or a background (where the visual line is indicated by an arrow D) is hindered by the front leg portion 12a, thereby blocking the front visual range.

SUMMARY OF THE INVENTION

The present invention is contrived to solve the above-mentioned problems. The invention is directed to providing an image pickup apparatus with enhanced operability of operation rings and a wide front visual range at the time of picking up an image.

According to an aspect of the invention, there is provided a grasp member of an image pickup apparatus comprising an image pickup apparatus body including a lens barrel unit at a front end thereof and a display unit at a rear end thereof, the grasp member being joined to the top portion of the image pickup apparatus body through leg portions, wherein a front one of the leg portions is joined to the image pickup apparatus body at an offset position on one of lateral sides with respect to an optical axis of light incident on the lens barrel unit.

According to another aspect of the invention, there is provided an image pickup apparatus comprising an image pickup apparatus body, a lens barrel unit located at the front end of the image pickup apparatus body in order for picking up an image of a subject, a display unit located at the rear end of the image pickup apparatus body in order for confirming contents of the picked-up image, and a grasp member located on the top of the image pickup apparatus body through leg portions, wherein a front one of the leg portions is joined to the image pickup apparatus body at an offset position on one of lateral sides with respect to t a central axis of the image pickup apparatus body.

According to the configurations described above, since the front leg portion of the grasp member is joined to the image pickup apparatus body at the position offset to either one of the lateral sides with respect to the optical axis of the light incident on the lens barrel unit, it is possible to enlarge the movable range of fingers handling a focus ring or a zoom ring of the lens barrel unit and to exclude a chance of hindering the front visual line of the photographer. Thus, extremely advantageous operability is achieved for photographers.

DESCRIPTION OF PREFERRED EMBODIMENT

The present invention provides a grasp member joined to the top portion of an image pickup apparatus body comprising a lens barrel unit at the front end and a display unit at the rear end through leg portions, wherein a front leg portion of the leg portions is joined to the image pickup apparatus body at a position which is offset to the left from an optical axis of light incident on the lens barrel unit. Accordingly, since the front leg portion of the grasp member, which has hindered a front visual range of a user and an operation of adjusting a focus ring and the like of the lens barrel unit, is located at an offset position, it is possible to provide excellent operability.

Hereinafter, an exemplary embodiment of the invention will be described with reference to FIGS. 1 and 2.

Figure 1:
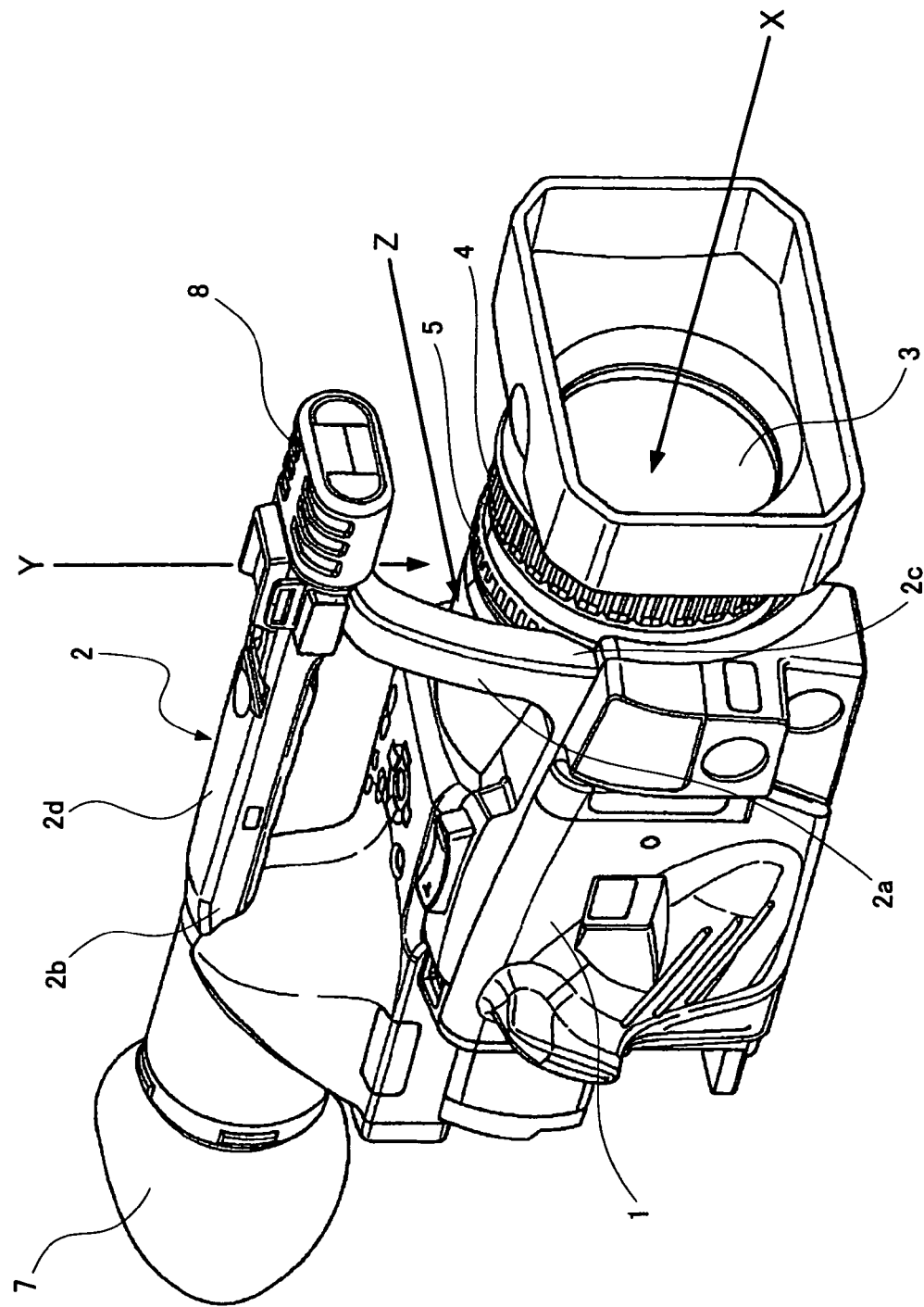
FIG. 1 is a front perspective view illustrating an image pickup apparatus and a grasp member thereof according to an exemplary embodiment of the present invention.

FIG. 1 is a front perspective view illustrating an image pickup apparatus and a grasp member thereof according to an exemplary embodiment of the invention. Referring to FIG. 1, an image apparatus body 1 includes at the front end thereof a lens barrel unit 3 for picking up an image of a subject. The image pickup apparatus body 1 includes at the upper rear end thereof a view finder 7 as a display for confirming the picked-up image.

A body portion 2d of the grasp member is located on the top of the image pickup apparatus body 1 to extend in the lengthwise direction of the image pickup apparatus body 1, and is joined to the body through a front leg portion 2a and a rear leg portion 2b. That is, the body portion 2d of the grasp member is a tube-shaped member having a rectangular shape in section and is joined to the top of the image pickup apparatus body 1 through the leg portions 2a and 2b to be parallel to the image pickup apparatus body 1 with a gap therebetween.

Accordingly, since a proper space is formed between the image pickup apparatus body 1 and the body portion 2*d* of the grasp member, the image pickup apparatus can be easily carried. It is preferable that the body portion 2*d* of the grasp member is located right above the center of gravity of the image pickup apparatus body 2. For this, the body portion 2*d* of the grasp member is located at a position that is a center of gravity in the lateral direction of the image pickup apparatus and that is right above the lens barrel unit 3.

A microphone 8 is provided at the front end of the grasp member 2. It is preferable that the center line of the microphone 8 orthogonal to the lateral direction thereof coincides with that of the lens barrel unit 3.

The front leg portion 2*a* is a curved tube body, and has a base connection portion 2*c* at the lower end thereof which is connected to the top portion of the image pickup apparatus 1. The upper end of the front leg portion is connected to the front end of the body portion 2*d* of the grasp member. To paraphrase, one end of the front leg portion 2*a* is connected to the front end of the body portion 2*d* of the grasp member and the base connection portion 2*c* thereof is connected to the image pickup apparatus body 1 at a position offset to the left from the optical axis direction X of incident light, that is a position offset to the left (in the direction indicated by an arrow Z) as the image pickup apparatus body 1 is viewed from the front side (in the optical axis direction X of incident light). In other words, the front leg portion 2*a* extends slantingly downward to the left from the body portion 2*d* of the grasp member and is finally connected to the left top of the image pickup apparatus body 1, wherein the left top is located at a position offset to the left from the lateral center of the image pickup apparatus body 1 as viewed from the front side. Accordingly, when adjusting a focus ring 4 and a zoom ring 5 to rotate, the fingers of a user can smoothly move to the base connection portion 2*c* between the front leg portion 2*a* and the image pickup apparatus body 1 without interfering with the front leg portion 2*a*.

Figure 2:
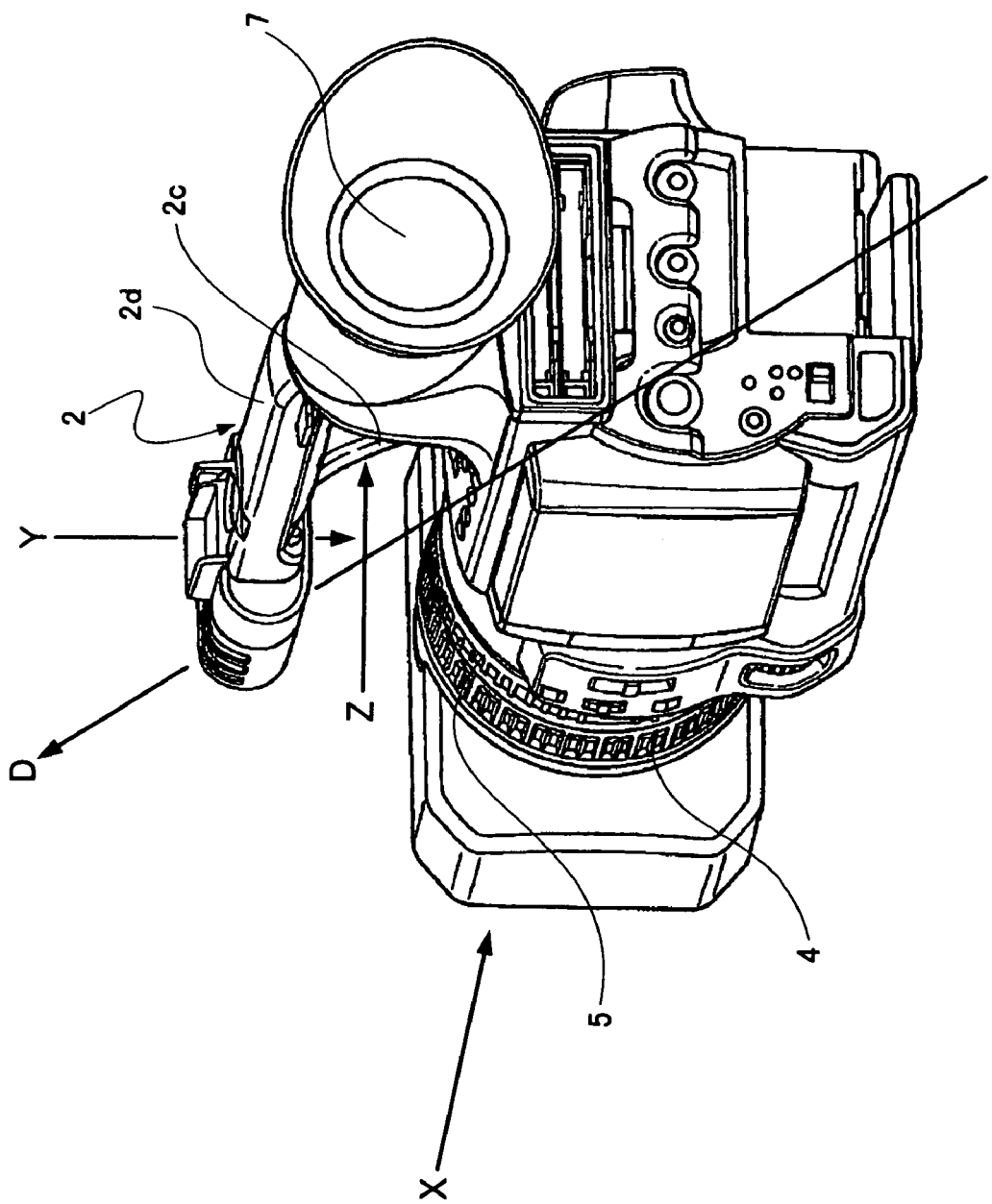
FIG. 2 is a rear perspective view illustrating the image pickup apparatus and the grasp member according to the exemplary embodiment of the invention at the time of picking up an image.
Figure 3:
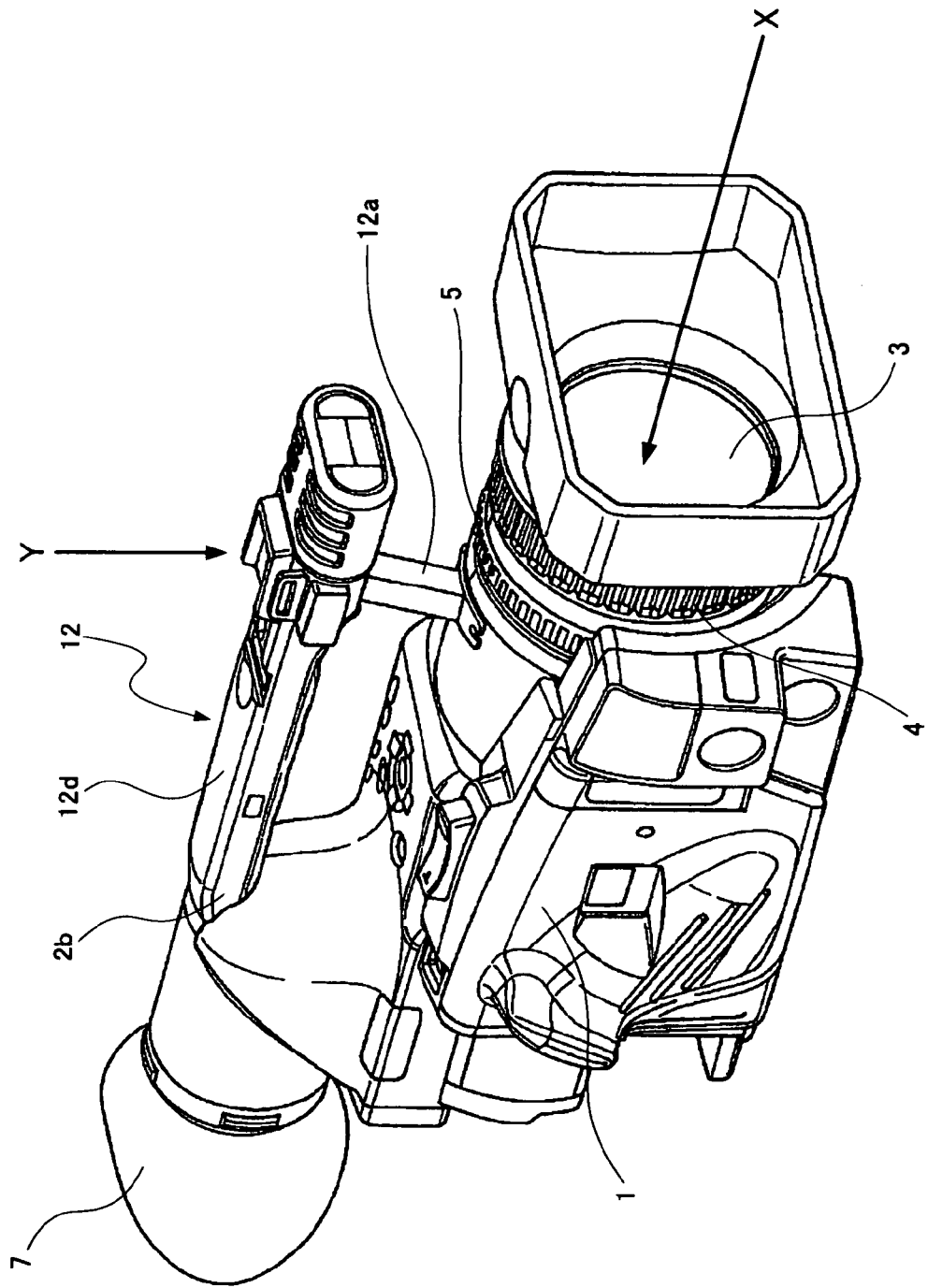
FIG. 3 is a front perspective view illustrating a conventional image pickup apparatus and a grasp member thereof.
Figure 4:
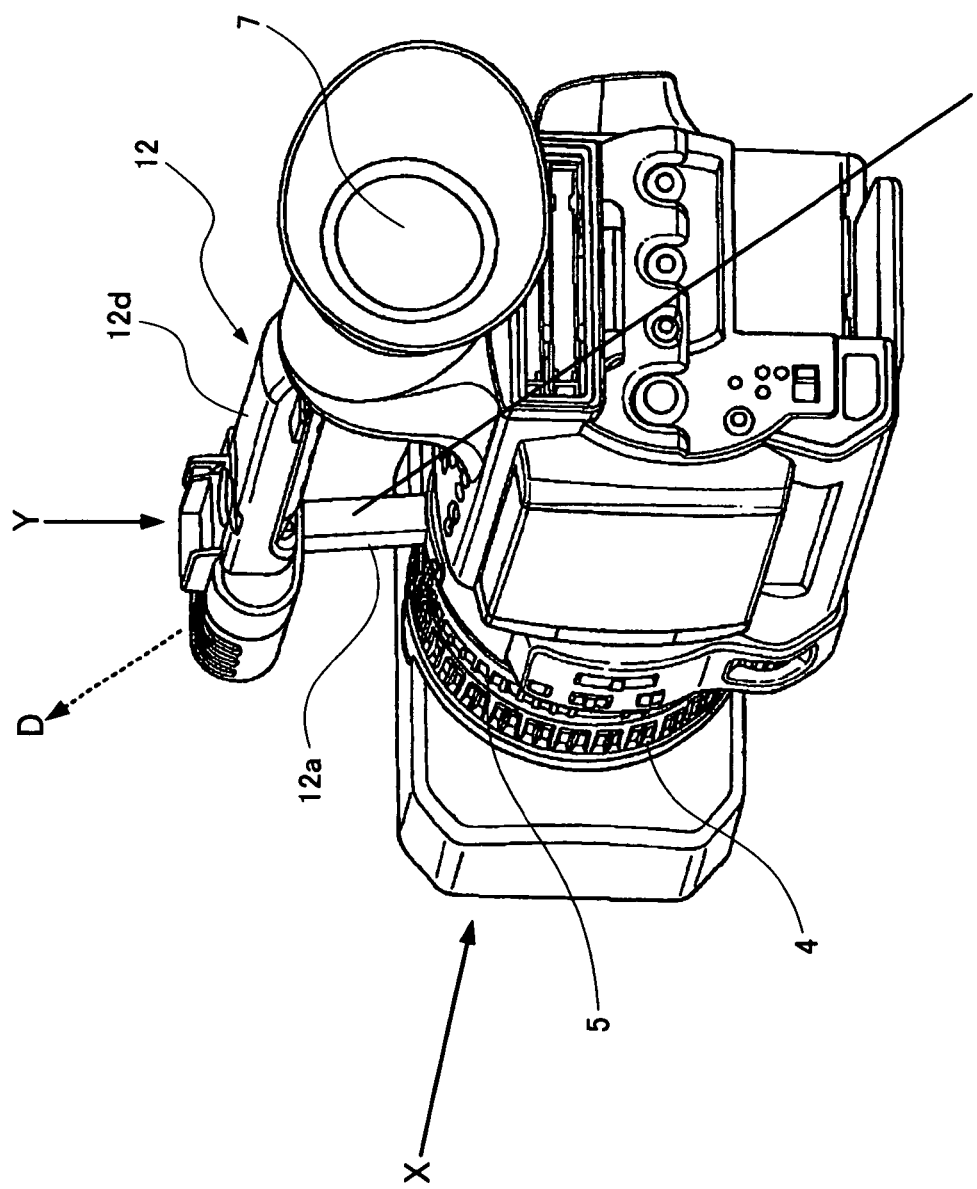
FIG. 4 is a rear perspective view illustrating the conventional image pickup apparatus and the grasp member thereof at the time of picking up an image.

FIG. 2 is a rear perspective view illustrating the image pickup apparatus according to the exemplary embodiment of the invention at the time of picking up an image. In FIG. 2, the base connection portion 2*c* between the image pickup apparatus body 1 and the front leg portion 2*a* of the grasp member 2 is located at a position offset to the left (the direction indicated by the arrow Z) from the optical axis direction X of light incident on the lens barrel unit 3. At the time of picking up an image, the right eye of the user approaches the view finder 7 to view the view finder 7 as a display unit. At this time, the left eye can view directly a subject or a background thereof without using the view finder 7 of the image pickup apparatus and the information obtained by the left eye is used as data for determining an image composition or a viewing angle. As shown in FIG. 2, the grasp member 2 of the image pickup apparatus according to the invention does not hinder the front visual line D of the user. That is, since the front leg portion 2*a* of the grasp member 2 is located at the offset position, the front leg portion 2*a* does not hinder the visual range of the left eye.

In the exemplary embodiment of the invention, it has been described that the user views the view finder with his/her right eye and views directly a subject with his left eye. However, the left and the right may be interchanged in the configuration of the apparatus.

The front leg portion 2*a* gradually rises up from the lateral side of the image pickup apparatus body 1 and is bent in the horizontal direction in the vicinity of the top portion thereof. But the grasp member 2 of the invention is not limited to such shape. That is, the front leg portion may have any one of other shapes such as opposite L shape, oblique strait line, circular arc, and parabola, as far as such shape does not hinder the visual line of the eye which is not used for viewing the view finder.

In the image pickup apparatus and the grasp member thereof according to the invention, the movable range of fingers handling the focus ring or the zoom ring of the lens barrel unit can be enlarged and the front visual line of the photographer is not hindered. Thus, the present invention can also apply to a professional image pickup apparatus that requires quick operation and circumferential judgment.

What is claimed is:

1. A grasp member of an image pickup apparatus comprising an image pickup apparatus body including a lens barrel unit at a front end thereof and a display unit at a rear end thereof, the grasp member being joined to a top portion of the image pickup apparatus body through leg portions, wherein
   a body portion of the grasp member is located at a center of gravity in the lateral direction of the image pickup apparatus and directly above the lens barrel unit, and
   a leg portion joined to a front body portion of the grasp member is joined to the image pickup apparatus body at an offset position on one of lateral sides with respect to an optical axis of light incident on the lens barrel unit.

2. The grasp member according to claim 1, wherein the front leg portion is joined to the image pickup apparatus body at an offset position on the left side with respect to the optical axis direction of light incident on the lens barrel unit.

3. The grasp member of the image pickup apparatus according to claim 1, wherein a microphone is provided at the front end portion of the grasp member.

4. An image pickup apparatus comprising:
   an image pickup apparatus body;
   a lens barrel unit located at a front end of the image pickup apparatus body, for picking up an image of a subject;
   a display unit located at a rear end of the image pickup apparatus body, for confirming contents of the picked-up image; and
   a grasp member located on top of the image pickup apparatus body through leg portions,
   wherein the body portion of the grasp member is located at a center of gravity in the lateral direction of the image pickup apparatus and directly above the lens barrel unit, and
   a leg portion joined to a front body portion of the grasp member is joined to the image pickup apparatus body at an offset position on one of lateral sides with respect to a central axis of the image pickup apparatus body.

5. The image pickup apparatus according to claim 4, wherein the front leg portion extends from a body portion of the grasp member toward a left lower position as seen in a frontal view of the image pickup apparatus, and is joined to the image pickup apparatus body at an offset position on the left side with respect to the central axis of the image pickup apparatus body.

6. An image pickup apparatus according to claim 5, wherein a microphone is provided at the front end portion of the grasp member.

* * * * *